(No Model.)
B. E. RYKER.
LOCOMOTIVE SPRING SADDLE.
No. 302,212. Patented July 15, 1884.
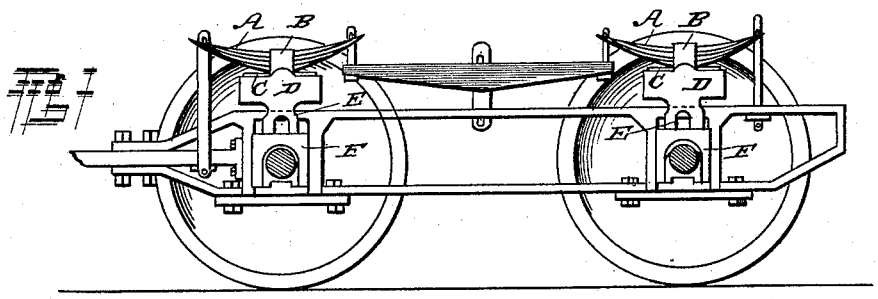
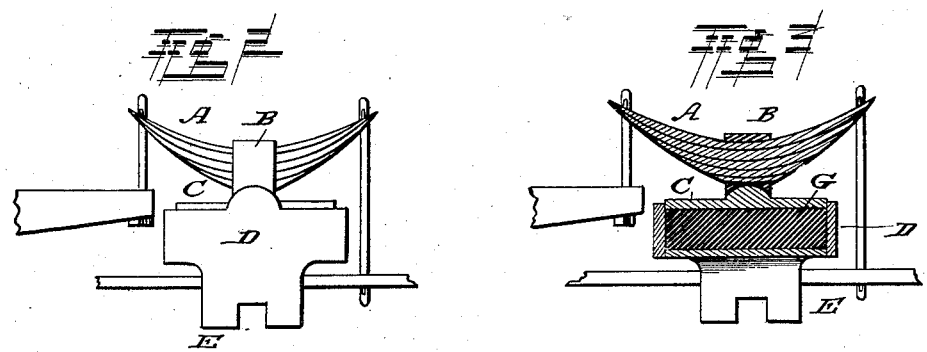

UNITED STATES PATENT OFFICE.

BRICE EDWIN RYKER, OF WARWICK, NEW YORK, ASSIGNOR OF ONE-HALF TO LEMUEL PADDOCK, OF SAME PLACE.

LOCOMOTIVE SPRING-SADDLE.

SPECIFICATION forming part of Letters Patent No. 302,212, dated July 15, 1884.

Application filed April 7, 1884. (No model.)

*To all whom it may concern:*

Be it known that I, BRICE EDWIN RYKER, a citizen of the United States, and a resident of Warwick, in the county of Orange and State of New York, have invented certain new and useful Improvements in Locomotive Spring-Saddles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of a locomotive-truck provided with my improved spring-saddle. Fig. 2 is a similar view of a saddle and its spring on an enlarged scale. Fig. 3 is a vertical section of the same.

Similar letters of reference indicate corresponding parts in all the figures.

My invention has relation to saddles for the springs in locomotive-trucks and similarly-constructed car-trucks; and it consists in the improved construction and combination of parts of a saddle having a spring or cushion of rubber or similar elastic material interposed between the portion of the saddle to which the semi-elliptic spring is secured and the portion of the saddle which is secured to the axle-bearing, as hereinafter more fully described and claimed.

In the accompanying drawings, the letter A indicates the semi-elliptic spring, upon which the weight of the forward portion of the locomotive falls, and the central clip, B, of which is secured to the center of a plate, C, which fits in the open top of a box, D, the downwardly-projecting lips E of which rest upon the axle-bearing F, sliding against the sides of the box. A spring or cushion, G, of rubber or similar elastic material, is placed in the said box, the sliding top plate resting upon the cushion, and it will be seen that this cushion will take up any sudden jars upon the bearings for the axle, preventing the said jars from breaking the semi-elliptic spring.

I am aware that it is not broadly new to interpose an elastic block between the middle of a locomotive or car spring and the box for the axle, and I do not claim such construction, broadly; but.

I claim—

The combination, in a spring-saddle for locomotive or similar trucks, of a box resting upon the axle-bearing, open at its top, and having its sides and ends closed, a spring or cushion of rubber or similar elastic material fitting inside the box, a semi-elliptical spring, and a plate secured to the middle of the spring corresponding in shape to the shape of the box, sliding within the sides and ends of the same, and resting upon the elastic spring or cushion, as and for the purpose shown and set forth.

In testimony that I claim the foregoing as my own I have hereunto affixed my signature in presence of two witnesses.

BRICE EDWIN RYKER.

Witnesses:
JOHN L. FINCH,
LEMUEL PADDOCK.